US009106290B2

(12) United States Patent
Ni et al.

(10) Patent No.: US 9,106,290 B2
(45) Date of Patent: Aug. 11, 2015

(54) METHOD, DEVICE, AND SYSTEM FOR SENDING CHANNEL STATE INFORMATION

(71) Applicant: Huawei Technologies Co., Ltd., Shenzhen, Guangdong (CN)

(72) Inventors: Jun Ni, Shenzhen (CN); Jiayin Zhang, Shenzhen (CN); Liang Xia, Shenzhen (CN); Yi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/094,553

(22) Filed: Dec. 2, 2013

(65) Prior Publication Data
US 2014/0086353 A1 Mar. 27, 2014

Related U.S. Application Data

(63) Continuation of application No. PCT/CN2011/075336, filed on Jun. 3, 2011.

(51) Int. Cl.
*H04B 7/04* (2006.01)
*H04B 7/06* (2006.01)
*H04L 5/00* (2006.01)

(52) U.S. Cl.
CPC ............ *H04B 7/0456* (2013.01); *H04B 7/0478* (2013.01); *H04B 7/0482* (2013.01); *H04B 7/0626* (2013.01); *H04B 7/0639* (2013.01); *H04B 7/061* (2013.01); *H04L 5/0048* (2013.01)

(58) Field of Classification Search
USPC .................... 375/267, 260, 299, 347, 349
See application file for complete search history.

(56) References Cited

U.S. PATENT DOCUMENTS

| 7,336,727 | B2 * | 2/2008 | Mukkavilli et al. ............ 375/299 |
| 2006/0285606 | A1 * | 12/2006 | Khojastepour et al. ....... 375/267 |
| 2007/0098106 | A1 * | 5/2007 | Khojastepour et al. ....... 375/267 |
| 2011/0134978 | A1 * | 6/2011 | Au-Yeung et al. ............ 375/224 |

(Continued)

FOREIGN PATENT DOCUMENTS

| CN | 101800628 A | 8/2010 |
| CN | 101807973 A | 8/2010 |
| CN | 101820335 A | 9/2010 |

(Continued)

OTHER PUBLICATIONS

"3GPP TSG-RAN WG1 Meeting 63—Periodic CQI/PMI/RI Reporting for Carrier Aggregation," Document R1-106064, Agenda item 6.2.1.2, Meeting 63, Jacksonville, Florida, 3$^{rd}$ Generation Partnership Project, Valbonne, France (Nov. 15-19, 2010).

(Continued)

*Primary Examiner* — Kabir A Timory
(74) *Attorney, Agent, or Firm* — Leydig, Voit & Mayer, Ltd.

(57) ABSTRACT

Embodiments of the present invention provide a method, device, and system for sending channel state information. The method for sending channel state information includes: setting number of bits used for quantizing a relative received power value; sending the number of bits to a user equipment UE; receiving a received power codebook index value; determining a received power codebook element corresponding to the received power codebook index value; and processing a signal according to the corresponding received power codebook element.

22 Claims, 8 Drawing Sheets

(56) References Cited

U.S. PATENT DOCUMENTS

2012/0033575 A1 2/2012 Zhang et al.
2012/0207240 A1 8/2012 Chen et al.

FOREIGN PATENT DOCUMENTS

| CN | 101867464 A | 10/2010 |
| CN | 101931511 A | 12/2010 |
| CN | 102082639 A | 6/2011 |
| EP | 2651066 A1 | 10/2013 |
| WO | 2010069242 A1 | 6/2010 |
| WO | 2011032588 A1 | 3/2011 |

OTHER PUBLICATIONS

"3GPP TSG RAN1 #65—CSI feedback for CoMP in different scenarios," Document R1-111648, Agenda item 6.3.1.3, Meeting 65, Barcelona, Spain, $3^{rd}$ Generation Partnership Project, Valbonne, France (May 9-13, 2011).

* cited by examiner

METHOD, DEVICE, AND SYSTEM FOR SENDING CHANNEL STATE INFORMATION

CROSS-REFERENCE TO RELATED APPLICATIONS

This application is a continuation of International Patent Application No. PCT/CN2011/075336, filed on Jun. 3, 2011, which is hereby incorporated by reference in its entirety.

TECHNICAL FIELD

The present invention relates to the wireless communication field, and in particular, to a method, device, and system for sending channel state information.

BACKGROUND

A conventional distributed antenna system (Distributed Antenna System, briefed as DAS) usually refers to a radio access structure. In this radio access structure, each antenna unit (Antenna Unit, briefed as AU) is installed with one or more antennas, which are placed at a regular interval in a cell and are configured to have a same cell identifier, briefed as cell ID (Identifier), all or some of the antennas are selected to serve a UE, and the selected antennas may send same or different signals. A centralized antenna system (Centralized Antenna System, briefed as CAS) is characterized in that antennas serving the UE are located at a same site (that is, a geographic position), and that the antennas also have a same cell ID.

A multi-user multiple input multiple output (Multiple Input Multiple Output) antenna system, briefed as a MIMO system, usually refers to a communication system in which a transmitter or receiver uses multiple antennas. The MIMO antenna system usually adopts distributed antennas, antennas at different sites in the system have different path losses to the UE, and transmit power of the antennas at different sites may be different. Therefore, the power received by the UE from different antennas is generally different. If a power difference caused by the path losses is not considered for the base station and the UE, system performance, such as the throughput and bit error rate, between the base station and the UE may be further degraded.

Currently, the codebook-based precoding MIMO system is a manner used by a mainstream wireless cellular system. The codebook-based precoding means that a receiver measures a radio channel from a transmitter to the receiver, to select an element from an element group, which is predefined and known by both the transmitter and the receiver, and sends a corresponding index value to the transmitter, so that the transmitter can choose to use the codebook to process a signal to be sent (the processing procedure is called precoding), and then send the signal. A set of an element group is called a precoding codebook, and one element therein is called a precoding codebook element, and the index value corresponding to the precoding codebook element is called a precoding matrix index (Precoding Matrix Index, briefed as PMI). Generally, during the process of selecting a precoding matrix index PMI, the user equipment (User Equipment, briefed as UE) needs to traverse all possible precoding codebook elements according to a specific indicator, such as a throughput rate, to select one making the indicator optimum, and sends the PMI corresponding to the selected precoding codebook element. After obtaining the PMI, the base station can obtain the corresponding precoding codebook element, and if the transmission period is short enough, it may be considered that the current downlink channel of the base station is approximate to the downlink channel measured by the UE. It is worth pointing out that the base station has a capability of independent selection and judgment. When sending a signal to the UE, the base station may use the precoding codebook element sent by the UE, or may use other precoding codebook elements, or may use precoding not based on the codebook, or even may select not to consider current scheduling before sending data to the UE, and this process is called a scheduling process of the base station. During reception, the UE may acquire which precoding codebook element is used when the signal is sent, and then perform demodulation.

Performance of a precoding-based MIMO system is usually superior to performance of a MIMO system not using precoding, and the precoding is usually based on the following assumptions: 1. Though the UE sends only the PMI corresponding to the precoding codebook, not a value of the channel, which is quantization or approximation, where the value of the channel contains all channel state information (Channel State Information, briefed as CSI), the base station can still acquire a downlink channel state through the precoding codebook to a large extent, and then process the sent signal on this basis, so that performance of UE reception is improved significantly. 2. When the UE sends the PMI corresponding to the codebook, only a small part of uplink bandwidth (called an overhead, that is, the uplink bandwidth that can transmit data to be sent to the base station by the UE is occupied by a non-data PMI) is occupied, a situation of improving downlink performance but sacrificing uplink performance will not occur.

Because the precoding-based MIMO system designs the codebook directly by using the criterion of the centralized antenna system, only the scenario where the antennas serving the UE belong to the same site (that is, a geographic position) and all the antennas serve the UE is considered for the design condition. If it is considered that the codebook designed by using the criterion of the centralized antenna system is applied to the scenario of the distributed antenna system, and a power difference caused by path losses from different antennas to the UE is taken into account, and factors to be considered in the centralized antenna system are included, all these make the size of the current codebook very large, hence increasing the feedback overhead and sacrificing the uplink performance.

If the UE sends PMIs of antennas at different sites, because the codebook elements corresponding to each sent PMI need to be further processed and combined as a large codebook element corresponding to the channel from the antenna that serves the UE to the UE, the UE needs to send a group of extra calibration values, resulting in large final feedback, hence increasing the feedback overhead and sacrificing the uplink performance. In addition, because the UE needs to send each PMI individually, a transmission sequence needs to be considered additionally, so that the scheduling of the base station can be performed smoothly, which increases complexity of the operation.

SUMMARY

Embodiments of the present invention provide a method, device, and system for sending channel state information, which can improve overall system performance.

In one aspect, a method for sending channel state information is provided, including: setting the number of bits used for quantizing a relative received power value, where the relative received power value is a difference between received power of an antenna port of a UE measurement set and minimum received power of all antenna ports; sending the number of bits to a user equipment UE, so that the UE and a base station determine a received power codebook according to the number of bits and the UE measurement set, where the received power codebook includes multiple received power codebook elements, and each received power codebook element corresponds to a received power codebook index value; receiving a received power codebook index value, where the received power codebook index value is selected from multiple received power codebook index values by the UE; determining a received power codebook element corresponding to the received power codebook index value according to the received power codebook index value received, and processing a signal according to the corresponding received power codebook element.

In one aspect, a method for sending channel state information is provided, including: receiving the number of bits used for quantizing a relative received power value, so that a UE and a base station determine a received power codebook according to the number of bits and a UE measurement set, where the received power codebook includes multiple received power codebook elements, each received power codebook element corresponds to a received power codebook index value, and the relative received power value is a difference between received power of an antenna port of the UE measurement set and minimum received power of all antenna ports; selecting a received power codebook index value from multiple received power codebook index values; and sending the selected received power codebook index value to the base station.

In one aspect, a device for sending channel state information is provided, including: a setting unit, a first sending unit, a first receiving unit, a determining unit, and a processing unit. The setting unit is configured to set the number of bits used for quantizing a relative received power value, where the relative received power value is a difference between received power of an antenna port of a UE measurement set and minimum received power of all antenna ports; the first sending unit is configured to send the number of bits to a UE, so that the UE and a base station determine a received power codebook according to the number of bits and the UE measurement set, where the received power codebook includes multiple received power codebook elements, and each received power codebook element corresponds to a received power codebook index value; the first receiving unit is configured to receive a received power codebook index value, where the received power codebook index value is selected from multiple received power codebook index values by the UE; the determining unit is configured to determine a received power codebook element corresponding to the received power codebook index value according to the received power codebook index value received; and the processing unit is configured to process a signal according to the corresponding received power codebook element.

In one aspect, a device for sending channel state information is provided, including a second receiving unit, an index value selecting unit, and a second sending unit. The second receiving unit is configured to receive the number of bits used for quantizing a relative received power value, so that a UE and a base station determine a received power codebook according to the number of bits and a UE measurement set, where the received power codebook includes multiple received power codebook elements, each received power codebook element corresponds to a received power codebook index value, and the relative received power value is a difference between received power of an antenna port of the UE measurement set and minimum received power of all antenna ports; the index value selecting unit is configured to select a received power codebook index value from multiple received power codebook index values; and the second sending unit sends the selected received power codebook index value to the base station.

In one aspect, a system for sending channel state information is provided. The system includes the above devices for sending channel state information.

According to the above solutions, by introducing a received power codebook and a corresponding feedback mechanism, the embodiments of the present invention can reduce a feedback overhead, improve a CSI feedback effect, realize antenna selection, and further improve overall system performance, and further are capable of multiplexing the precoding codebook of the existing centralized antenna system, thereby reducing complexity of the system.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

Figure 1:
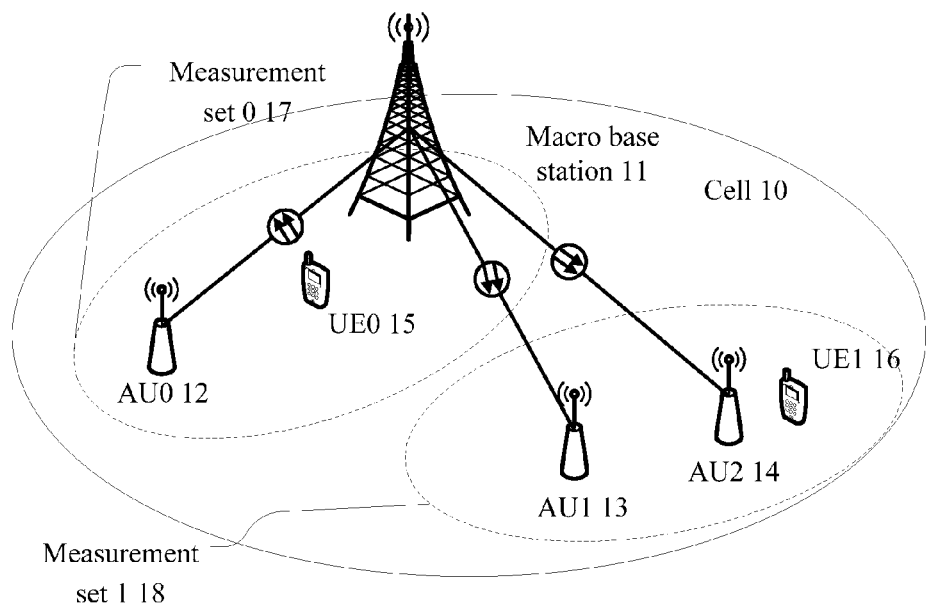
FIG. 1 is a schematic diagram of a networking scenario according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments in the present invention without creative efforts shall fall within the protection scope of the present invention.

The technical solutions of the present invention are applicable to various communication systems, such as the GSM, a code division multiple access (CDMA, Code Division Multiple Access) system, wideband code division multiple access (WCDMA, Wideband Code Division Multiple Access), general packet radio service (GPRS, General Packet Radio Service), and long term evolution (LTE, Long Term Evolution).

A user equipment (UE, User Equipment), also called a mobile device or a mobile terminal (Mobile Terminal), may communicate with one or more core networks through a radio access network (such as an RAN, Radio Access Network). The user equipment may be a mobile terminal, like a mobile phone (or called a "cellular" phone) and a computer with a mobile terminal, for example, portable, pocket-sized, handheld, computer-built-in, or vehicle-mounted mobile devices, which exchange voices and/or data with the radio access network.

A base station may be a base station (BTS, Base Transceiver Station) in GSM or CDMA, or a base station (NodeB) in WCDMA, or an evolved base station (eNB or e-NodeB, Node B) in LTE, which is not limited in the present invention, but for ease of description, Node B is taken as an example for description in the following embodiments.

Because in an actual distributed scenario, many antennas may be deployed in a cell, for a designated UE, the base station just needs to select a part thereof to serve the UE. An antenna port (antenna port) is a term already defined in the LTE standard, and differs from a (physical) antenna in general conception. The antenna port is characterized by a reference signal (Reference Signal) defined thereon, for example, a CSI reference signal (Channel State Information Reference Signal, briefed as CSI-RS) defined in LTE Release 10. That is, if a certain antenna port is given, the pattern of a reference signal associated with the antenna port is acquired, and then, a channel corresponding to data mapped to the antenna port may be obtained from the reference signal. In actual use, an antenna port may correspond to an antenna, or an antenna port may correspond to multiple antennas, or multiple antenna ports may correspond to an antenna. For example, if a same antenna port is mapped to both antennas of a transmitter, a receiver always sees one antenna port only, but the channel from the transmitter to the receiver at this time is a combination of channels from two transmitting antennas to one receiving antenna. It is worth pointing out that, the LTE standard also defines a concept of reference signal configuration, that is, multiple groups of reference signals are distinguished in a same group of antenna ports, and each group is called a configuration. Each UE may be designated to receive different configurations, and in this way, though different UEs may be configured with a same group of antenna ports, the UEs can still use different reference signal configurations to perform channel measurement, and then multiple UEs may distinguish multiple groups of reference signals in a same group of antenna ports. Therefore, each UE may still be regarded to be independently configured with a group of antenna ports. All the antenna ports in the embodiments of the present invention are for every UE.

The base station firstly notifies the UE of a set of specific antenna ports (called a UE measurement set hereinafter) through signaling to perform measurement, and then sends CSI information, which is from the antenna ports in the set to the UE, to the base station. After obtaining the CSI information sent by the UE, the base station selects all or some antenna ports from the measurement set to serve the UE.

FIG. 1 is a schematic diagram of a networking scenario according to an embodiment of the present invention.

In the schematic diagram shown in FIG. 1, a cell 10 has a macro base station 11, three antenna units AU0 12, AU1 13, and AU2 14 in connection (such as fiber connection) with the macro base station, two user equipments UE0 15 and UE1 16, and two measurement sets, which are measurement set 0 17 and measurement set 1 18.

The measurement set of UE0 15 is the measurement set 0, which includes the macro base station 11 and AU0, and the measurement set of UE1 is the measurement set 1, which includes AU1 and AU2. It is worth pointing out that, the measurement sets for different UEs may be different, and as time goes on, for example, the UEs move and the channel environment changes, the measurement set of the same UE may also change. In this embodiment of the present invention, the base station has designated a measurement set for the UE and notified the UE by using a specific method.

Figure 2:
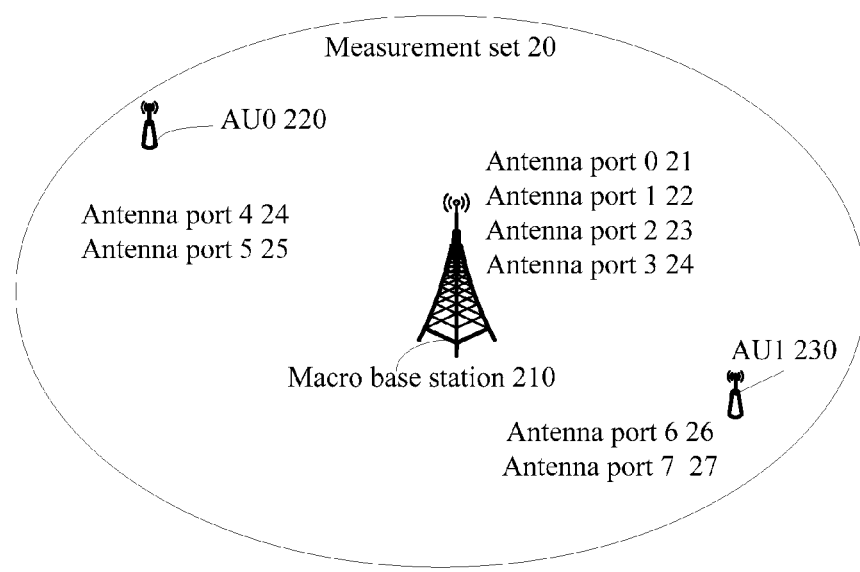
FIG. 2 is a schematic diagram of a UE measurement set according to an embodiment of the present invention.

FIG. 2 is a schematic diagram of a UE measurement set.

As shown in FIG. 2, for a specific UE, the measurement set 20 includes eight antenna ports in total. A macro base station 210 has four antennas, that is, antennas 0-3. The other two sites have AU0 220 and AU1 230 respectively. Each AU has two co-sited antennas: antennas 4 and 5 and antennas 6 and 7. The eight antennas are configured with reference signals of the eight antenna ports defined in LTE Release 10, like a CSI-RS, that is, the antennas 0-7 correspond to antenna ports 21-27 on a one-to-one basis respectively. In addition, a CSI-RS configuration defined in the LTE standard is designated for the UE.

Figure 3:
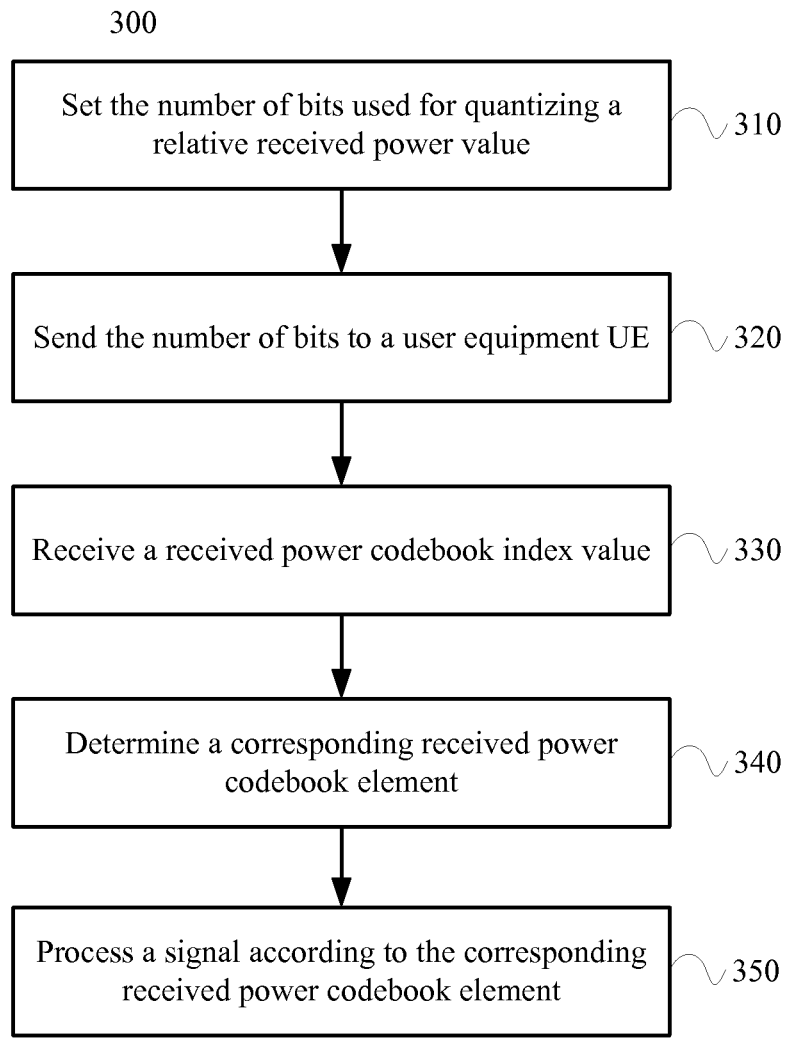
FIG. 3 is a schematic diagram of a method for sending channel state information according to an embodiment of the present invention.

FIG. 3 is a schematic diagram of a method 300 for sending channel state information according to an embodiment of the present invention.

Process 310 in FIG. 3: Set the number of bits used for quantizing a relative received power value, where the relative received power value is a difference between received power of an antenna port of a UE measurement set and minimum received power of all antenna ports.

A base station sets the number of bits used for quantizing the relative received power value, and may set it at will.

The relative received power refers to a relative received power value obtained for each antenna port by the UE after the UE firstly finds out which antenna port the minimum received power comes from, and then subtracts the minimum value from the received power from each antenna port. The obtained relative received power is a continuously changing value, and if the value is sent directly, an occupied overhead is excessively large. Generally, the sent relative received power value is discrete, so the obtaining of the discrete value inevitably involves a problem of quantization.

Process 320 in FIG. 3: Send the number of bits used for quantizing the relative received power value to the user equipment UE, and the UE and the base station determine a received power codebook according to the number of bits used for quantizing the relative received power value and the UE measurement set.

The UE measurement set refers to a set of antenna ports that the base station designates and notifies the UE to measure by using a specific method. Reference is made to the networking scenario in FIG. 1 and the UE measurement set in FIG. 2. In this embodiment, the site of at least one antenna port is different from the sites of other antenna ports. In this embodiment of the present invention, the base station has designated a measurement set for the UE and notified the UE by using a specific method.

The base station sends the number of bits used for quantizing the relative received power value to the UE. According to the two conditions, namely the number of bits used for quantizing the relative received power value and the UE measurement set, the UE and the base station may determine the pre-known received power codebook used therebetween. For example, when the number of bits used for quantizing the relative received power value is the same, but the number of antenna ports of the UE measurement set is different, the UE and the base station determine to use different received power codebooks. The received power codebook includes multiple received power codebook elements, and each received power codebook element corresponds to a received power codebook index value.

Process 330 in FIG. 3: Receive a received power codebook index value, where the received power codebook index value is selected from multiple received power codebook index values by the UE.

During the process of selecting the received power codebook, the UE needs to traverse all possible received power codebooks, according to a specific system indicator such as a throughput rate or a maximized channel capacity, to select one making the indicator optimum as the selected received power codebook.

Process 340 in FIG. 3: Determine a received power codebook element corresponding to the received power codebook index value according to the selected received power codebook index value.

After obtaining the received power codebook index value, the base station acquires the received power codebook element selected by the UE, and then takes it into account at the beginning of resource scheduling.

Process 350 in FIG. 3: Process a signal according to the corresponding received power codebook element.

According to the corresponding received power codebook element, some antenna ports may be selected to serve the UE, or some antenna ports may be refused to serve the UE, where refusing some antenna ports to serve the UE means turning off the antenna ports to refuse to serve the UE.

In addition, a downlink channel is estimated according to the corresponding received power codebook element, so that precoding processing is performed. When estimating the downlink channel, the base station may introduce a power difference among antennas which is not carried in the original precoding codebook element, and then obtain a more accurate channel estimation value, which may be further used in an inverse operation of channel estimation in the precoding processing not based on a codebook. The so-called introducing the power difference among antennas, may be correspondingly multiplying the channel estimation value by power differences from different antenna ports to the UE after the channel estimation value is obtained from the precoding codebook element, so as to obtain a new estimated channel.

It is worth pointing out that, the base station has a capability of independent selection during the scheduling process, that is, the base station may use the received power codebook index value sent by the UE, or may make a decision on its own, or may select not to schedule resources or send data for the UE at the current scheduling time.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 4:
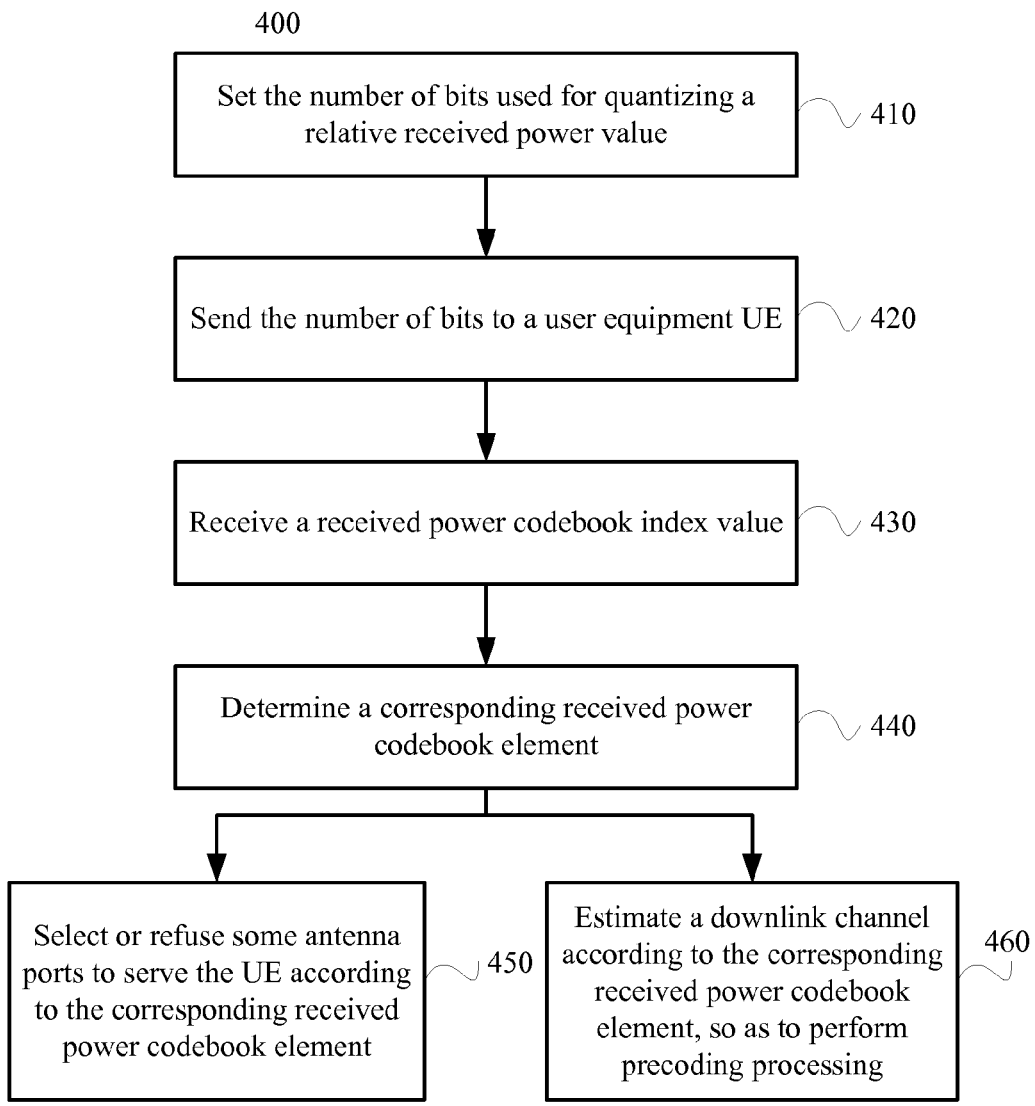
FIG. 4 is a schematic diagram of a method for sending channel state information according to another embodiment of the present invention

FIG. 4 is a schematic diagram of a method 400 for sending channel state information according to another embodiment of the present invention.

Processes 410, 420, 430, and 440 in FIG. 4 are respectively the same as or similar to processes 310, 320, 330, and 340 in FIG. 3. FIG. 4 includes processes 450 and 460, which are different from process 350 in FIG. 3.

Process 410 in FIG. 4: Set the number of bits used for quantizing a relative received power value, where the relative received power value is a difference between received power of an antenna port of a UE measurement set and minimum received power of all antenna ports.

Process 420 in FIG. 4: Send the number of bits used for quantizing the relative received power value to a user equipment UE, and the UE and a base station determine a received power codebook according to the number of bits used for quantizing the relative received power value and the UE measurement set.

Process 430 in FIG. 4: Receive a received power codebook index value, where the received power codebook index value is selected from multiple received power codebook index values by the UE.

Process 440 in FIG. 4: Determine a received power codebook element corresponding to the received power codebook index value according to the selected received power codebook index value.

As an embodiment of process 410 of FIG. 4, the number of bits used for quantizing the relative received power value is equal to the number of antenna ports of the UE measurement set.

If the number of antenna ports of the UE measurement set is 2, 4, or 8 respectively, the number of bits of the corresponding received power codebook element is 2, 4, or 8 respectively. The received power codebook may be determined according to the number of bits used for quantizing the relative received power value and the number of antenna ports of the UE measurement set. For example, the received power codebook with the number of antenna ports being 2 corresponds to a group of codebook elements with the number being $2^2=4$; the received power codebook with the number of antenna ports being 4 corresponds to a group of codebook elements with the number being $2^4=16$; and the received power codebook with the number of antenna ports being 8 corresponds to a group of codebook elements with the number being $2^8=256$. Generally, the number of antenna ports of the UE measurement set is 2, 4, or 8. Once set, the received power codebook does not need to be changed.

As another embodiment of process 410 in FIG. 4, the received power codebook element carries first selection information and second selection information, where the first selection information indicates that the received power from the antenna port is high received power, and the second selection information indicates that the received power from the antenna port is low received power.

For example, values of the received power codebook element include 1 and 0, where 1 indicates that the received power from the antenna port is high received power, and 0 indicates that the received power from the antenna port is low received power.

Referring to the above two embodiments, Table 1 shows an 8-bit received power codebook, which is used in a situation where the UE measurement set includes 8 antenna ports, and the number of bits used for quantizing the relative received power value is equal to the number of antenna ports of the UE measurement set, that is, 8.

TABLE 1

| Received Power Codebook Index Value | Received Power Codebook Element |
|---|---|
| 0 | $[1, 1, 1, 1, 0, 0, 0, 0]^T$ |
| 1 | $[0, 0, 0, 0, 1, 1, 0, 0]^T$ |
| 2 | $[0, 0, 0, 0, 0, 0, 1, 1]^T$ |
| 3 | $[0, 0, 0, 0, 0, 0, 0, 1]^T$ |
| 4 | $[1, 1, 0, 0, 0, 0, 0, 0]^T$ |
| ... | ... |
| 255 | $[1, 1, 1, 1, 1, 1, 1, 1]^T$ |

In the example of the UE measurement set in FIG. 2, 1 in the received power codebook element in Table 1 represents that the UE measures and judges that the designated antenna port has high received power, and 0 represents that the designated antenna port has low received power. According to the corresponding received power codebook element determined in process 430 in FIG. 4, the base station may usually select to turn on the antenna port corresponding to the value 1 to serve the UE; and turn off the antenna port corresponding to the value 0 to refuse to serve the UE. For example, if the sent received power codebook index value is 0, it indicates that the UE measures and judges that the antenna ports 0-3 have high received power, while the antenna ports 4-7 have low received power. The received power codebook index values 0-3 correspond to respectively turning on the antenna ports of the three sites in a cell, and the received power codebook index value 4 is used to turn on the first two antennas among four antennas of the macro base station, and other situations are not listed one by one.

The superscript T in the table indicates a transpose operation for a matrix.

Table 1 shows that the 8-bit received power codebook has 256 possibilities in total, that is, all possible situations are traversed. As an another optional embodiment, the 8-bit received power codebook may also be one preferred among the 256 possibilities, that is, a part of unused received power codebooks are excluded, for example, a situation where 3, 5, or 7 antennas are turned on may not be used. 8 bits may indicate $2^8=256$ situations, and 7 bits may indicate $2^7=128$ situations. If the received power codebook selectable by the UE is a preferred received power codebook, and the number is less than 128, one bit may be saved, and 7 bits are enough. In addition, it is considered that the base station has notified the UE in another manner, so that the preferred received power codebook is known to the UE.

Process 450 in FIG. 4: Turn on or refuse some antenna ports to serve the UE according to the corresponding received power codebook element, where refusing some antenna ports to serve the UE means turning off the antenna ports to refuse to serve the UE.

Regarding the situation where the received power codebook element is 0 or 1, the base station may select to turn on or turn off corresponding antenna ports according to the values of 0 and 1.

Process 460 in FIG. 4: Estimate a downlink channel according to the corresponding received power codebook element, so as to perform precoding processing.

For the situation where the received power codebook element is not 0 or 1, when estimating the downlink channel, the base station may introduce a power difference among antennas which is not carried in the original precoding codebook element, and then obtain a more accurate channel estimation value, which may be further used in an inverse operation of channel estimation in the precoding processing not based on a codebook. The so-called introducing the power difference among antennas, may be correspondingly multiplying the channel estimation value by power differences from different antenna ports to the UE after the channel estimation value is obtained from the precoding codebook element, so as to obtain a new estimated channel.

From the above description, after the relative received codebook is taken into account, system performance affected by path losses from different antenna ports to the UE in the distributed antenna system scenario applied in the embodiment of the present invention is comprehensively considered and optimized when a signal is processed.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 5:
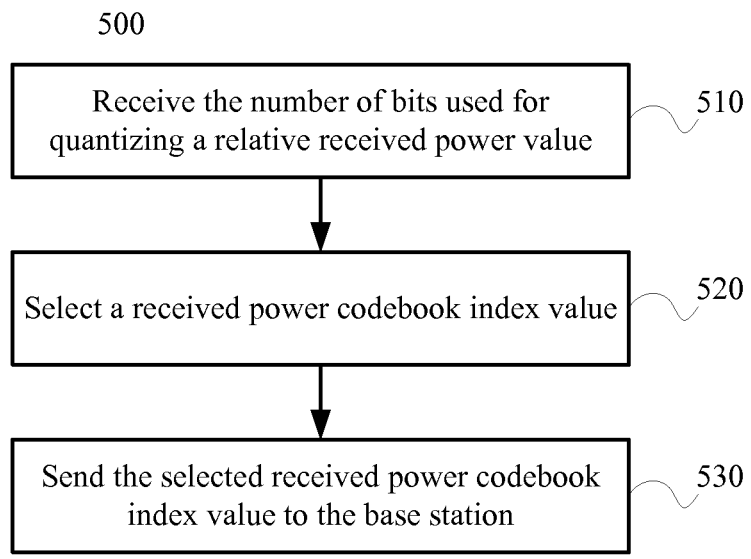
FIG. 5 is a schematic diagram of a method for sending channel state information according to another embodiment of the present invention.

FIG. 5 is a schematic diagram of a method 500 for sending channel state information according to another embodiment of the present invention.

Process 510 in FIG. 5: Receive the number of bits used for quantizing a relative received power value, so that a UE and a base station determine a received power codebook according to the number of bits and a UE measurement set.

The UE receives the number of bits used for quantizing the relative received power value. According to the two conditions, namely the number of bits used for quantizing the relative received power value and the UE measurement set, the UE and the base station may determine the pre-known received power codebook used therebetween. For example, when the number of bits used for quantizing the relative received power value is the same, but the number of antenna ports of the UE measurement set is different, the UE and the base station determine to use different received power codebooks.

The relative received power refers to a relative received power value obtained for each antenna port by the UE after the UE firstly finds out which antenna port the minimum received power comes from, and then subtracts the minimum value from the received power from each antenna port. The obtained relative received power is a continuously changing value, and if the value is sent directly, an occupied overhead is excessively large. Generally, the sent relative received power value is discrete, so the obtaining of the discrete value inevitably involves a problem of quantization.

The UE measurement set refers to a set of antenna ports that the base station designates and notifies the UE to measure by using a specific method. Reference is made to the networking scenario in FIG. 1 and the UE measurement set in FIG. 2. In this embodiment, the site of at least one antenna port is different from the sites of other antenna ports. In this embodiment of the present invention, the base station has designated a measurement set for the UE and notified the UE by using a specific method.

The received power codebook includes multiple received power codebook elements, and each received power codebook element corresponds to a received power codebook index value.

Process 520 in FIG. 5: Select a received power codebook index value from multiple received power codebook index values.

During the process of selecting the received power codebook, the UE needs to traverse all possible received power codebooks, according to a specific system indicator such as a throughput rate, or a maximized channel capacity, to select one making the indicator optimum as the selected received power codebook.

Process 530 in FIG. 5: Send the selected received power codebook index value to the base station.

The UE sends the received power codebook index value to the base station periodically or aperiodically.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 6:
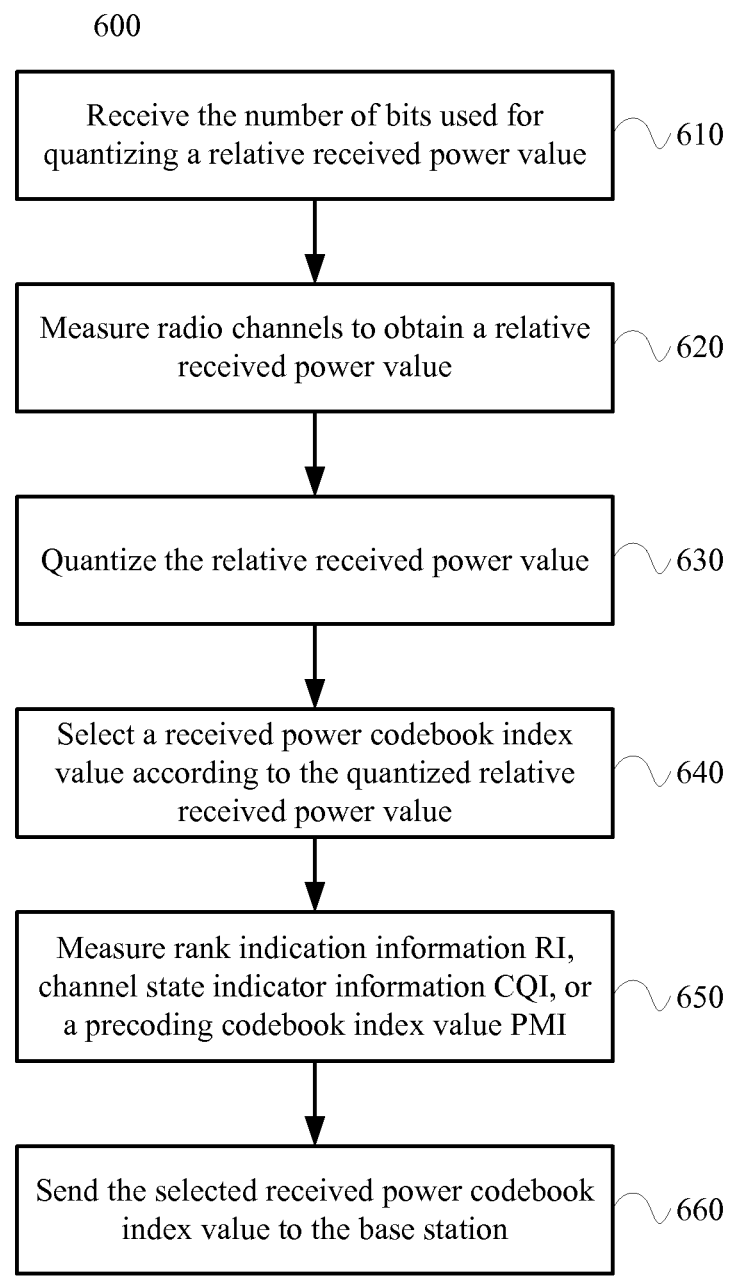
FIG. 6 is a schematic diagram of a method for sending channel state information according to another embodiment of the present invention.

FIG. 6 is a schematic diagram of a method 600 for sending channel state information according to another embodiment of the present invention.

Processes 610, 640, and 660 in FIG. 6 are respectively the same as or similar to processes 510, 520, and 530 in FIG. 5. FIG. 6 further includes processes 620, 630, and 650, which is different from FIG. 5.

Process 610 in FIG. 6: Receive the number of bits used for quantizing a relative received power value, so that a UE and a base station determine a received power codebook according to the number of bits and a UE measurement set.

According to the two conditions, namely the number of bits used for quantizing the relative received power value and the UE measurement set, the UE and the base station may determine the pre-known received power codebook used therebetween. For example, when the number of bits used for quantizing the relative received power value is the same, but the number of antenna ports of the UE measurement set is different, the UE and the base station determine to use different received power codebooks.

As an embodiment of the number of bits used for quantizing the relative received power value, the number of bits used for quantizing the relative received power value is equal to the number of antenna ports of the UE measurement set.

A situation where the UE measurement set includes 4 antenna ports is taken as an example hereinafter.

Process 620 in FIG. 6: Measure radio channels according to the number of antenna ports of the UE measurement set, so as to obtain a relative received power value, where the radio channels refer to radio channels from the base station to antenna ports of the UE measurement set.

The UE respectively measures received power from the 4 antenna ports of the UE measurement set. After finding minimum received power, the UE subtracts the minimum received power from the received power of each antenna port, and then obtains the relative received power value of each antenna port.

Process 630 in FIG. 6: Quantize the relative received power value according to the number of bits used for quantizing the relative received power value.

Process 640 in FIG. 6: Select a received power codebook index value from multiple received power codebook index values according to the quantized relative received power value.

As an option of the number of bits used for quantizing the relative received power value in this embodiment, the number of bits used for quantizing the relative received power value is equal to the number of antenna ports of the UE measurement set.

As another embodiment, in the codebook design, the received power codebook element carries first selection information and second selection information, where the first selection information indicates that the received power from the antenna port is high received power, and the second selection information indicates that the received power from the antenna port is low received power.

A situation where the UE measurement set includes 4 antenna ports is taken as an example hereinafter. When the number of bits used for quantizing the relative received power value is 4, a quantization table is set. A quantized result value range is $\{0, 3\}$, (the unit is dB), and corresponding binary bits are respectively $\{0, 1\}$. If the relative received power values of the antenna ports are 0, 1.5, 7, and 3.5 dB respectively, and a threshold is set to indicate that a value larger than 3 dB represents high received power, and that a value smaller than 3 dB represents low received power, the received power codebook elements which are fed back after quantization are $[0, 0, 1, 1]^T$ (the superscript T indicates a transpose operation for a matrix), and then a corresponding received power codebook index value is found out from a predefined received power codebook set.

Feeding back the quantized relative received power value is taken as a predetermined criterion herein, and a received power codebook index value is selected from multiple received power codebook index values. The predetermined criterion may also be other criteria, like maximizing a throughput rate, or maximizing a channel capacity.

According to the received power codebook element, the base station may usually select to turn on the antenna ports corresponding to values other than 0 to serve the UE; and turn off the antenna port corresponding to the value 0 to refuse to serve the UE.

Process 650 in FIG. 6: Measure rank indication RI, channel quality indication CQI, or a precoding matrix index PMI after the received power codebook index value is selected.

If the UE is required to measure the rank indication RI, the channel quality indication CQI, or the precoding matrix index PMI, the measurement is performed after the received power codebook index value is selected. A power difference among antennas which is carried in the received power codebook element is multiplexed, and then a more accurate channel estimation value is obtained to measure the rank indication RI, the channel quality indication CQI, or the precoding matrix index PMI. Therefore, the measured information reflects the channel information more accurately or the system overhead is reduced. For example, at this time, only the radio channel between the antenna port turned on by the base station for the UE and the UE is measured.

Referring to the example in process 640 in FIG. 6, the received power codebook element corresponding to the received power codebook index value selected by the UE represents that the base station will only select some antenna ports in the measurement set to serve the UE, but the precoding codebook used when the UE measures the PMI may be the precoding codebook of all antenna ports. In this way, all antenna selection situations are applicable without designing a precoding codebook for each antenna port. As another alternative, a precoding codebook corresponding to the selected number of antenna ports may also be used. It is considered that the base station has notified the UE of the specifically used precoding codebook in a certain manner, for example, if the measurement set includes 8 antennas, and a quantization table with a quantized value range of $\{0, 1\}$ is used to quantize the relative received power value, 2, 4, or 8 antenna ports may be selected. After that, when the precoding codebook is used to measure the rank indication RI, the channel quality indication CQI, or the precoding matrix index PMI, the current precoding codebook of the 2, 4, or 8 antenna ports is used to correspond to situations of selecting 2, 4, or 8 antenna ports.

Process 660 in FIG. 6: Send the selected received power codebook index value to the base station.

The UE performs transmission to the base station through a PUCCH or PUSCH channel, and the transmission is periodic and aperiodic respectively. For periodic transmission, a transmission period for sending the selected received power codebook index value to the base station is set to be the same as or longer than that for sending the rank indication RI, and a time offset may be the same as that of the rank indication RI. Because the received power codebook is in a wideband feature, if the UE needs to feed back the received power codebook in a subframe, during the UE measurement, it is necessary to assume that the transmission is performed in all sub-bands, so as to obtain the received power codebook index value.

Table 2 below shows a periodic transmission mode using a PUCCH, which is compatible with the existing standard LTE Release 10.

TABLE 2

| PUCCH Format | Report | Mode State | PUCCH Report Mode | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 7 | Received power codebook | 2 CSI-RS antenna ports | 2*N | 2*N | N/A | N/A |
| | | 4 CSI-RS antenna ports | 4*N | 4*N | N/A | N/A |
| | | 8 CSI-RS antenna ports | 8*N | 8*N | N/A | N/A |

LTE Release 10 has originally defined PUCCH formats 1-6 and corresponding sub-modes, and therefore in Table 2, the newly-added PUCCH format is designed to be 7. Mode 1-1, mode 2-1, mode 1-0, and mode 2-0 are different types defined in LTE Release 10 for responding to the PMI, RI, and CQI. N represents the number of bits used for quantizing the relative received power value. N/A indicates that the received power codebook is not applicable in the modes and mode states in the table. A bandwidth part (Bandwidth part, briefed as BP) is defined in LTE Release 10, including one or more continuous sub-bands, and used as a unit of UE measurement and feedback. For the received power codebook, because it reflects a wideband feature, all values on the BP should be the same.

For aperiodic transmission, once a high layer is configured to trigger to send the received power codebook in the current subframe, during the UE measurement, it is necessary to assume that the transmission is performed in all sub-bands, so as to obtain the received power codebook index value. The number of bits occupied during aperiodic transmission using a PUSCH is shown in Table 3 below.

TABLE 3

| | Mode State | Occupied Bit |
|---|---|---|
| Received power codebook | 2 CSI-RS antenna ports | 2 * N |
| | 4 CSI-RS antenna ports | 4 * N |
| | 8 CSI-RS antenna ports | 8 * N |

By introducing a received power codebook and a corresponding feedback mechanism, the embodiment of the present invention can reduce a feedback overhead, improve a CSI feedback effect, realize antenna selection, and further improve overall system performance. Further, the codebook of the existing centralized antenna system can be multiplexed, complexity of the system is reduced, and compatibility is strong.

Figure 7:
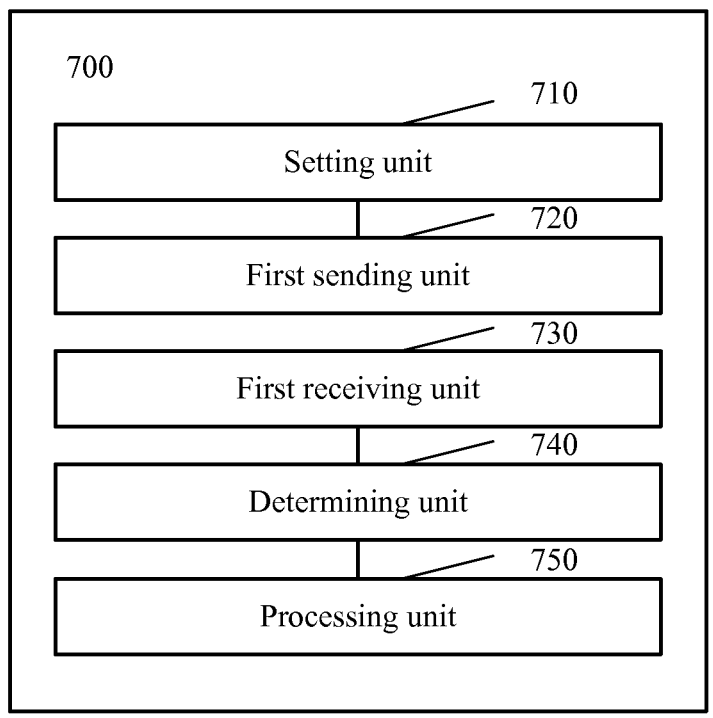
FIG. 7 is a block diagram of a device for sending channel state information according to an embodiment of the present invention.

FIG. 7 is a block diagram of a device 700 for sending channel state information according to an embodiment of the present invention.

The device 700 includes a setting unit 710, a first sending unit 720, a first receiving unit 730, a determining unit 740, and a processing unit 750.

The setting unit 710 is configured to set the number of bits used for quantizing a relative received power value, where the relative received power value is a difference between received power of an antenna port of a UE measurement set and minimum received power of all antenna ports.

A base station sets the number of bits used for quantizing the relative received power value, and may set it at will.

The relative received power refers to a relative received power value obtained for each antenna port by the UE after the UE firstly finds out which antenna port the minimum received power comes from, and then subtracts the minimum value from the received power from each antenna port. The obtained relative received power is a continuously changing value, and if the value is sent directly, an occupied overhead is excessively large. Generally, the sent relative received power value is discrete, so the obtaining of the discrete value inevitably involves a problem of quantization.

The first sending unit 720 is configured to send the number of bits used for quantizing the relative received power value to the user equipment UE. The UE and the base station determine a received power codebook according to the number of bits used for quantizing the relative received power value and the UE measurement set.

The UE measurement set refers to a set of antenna ports that the base station designates and notifies the UE to measure by using a specific method. Reference is made to the networking scenario in FIG. 1 and the UE measurement set in FIG. 2. In this embodiment, the site of at least one antenna port is different from the sites of other antenna ports. In this embodiment of the present invention, the base station has designated a measurement set for the UE and notified the UE by using a specific method.

The base station sends the number of bits used for quantizing the relative received power value to the UE. According to the two conditions, namely the number of bits used for quantizing the relative received power value and the UE measurement set, the UE and the base station may determine the pre-known received power codebook used therebetween. For example, when the number of bits used for quantizing the relative received power value is the same, but the number of antenna ports of the UE measurement set is different, the UE and the base station determine to use different received power codebooks.

The received power codebook includes multiple received power codebook elements, and each received power codebook element corresponds to a received power codebook index value.

The first receiving unit 730 is configured to receive a received power codebook index value, where the received power codebook index value is selected from multiple received power codebook index values.

During the process of selecting the received power codebook, the UE needs to traverse all possible received power codebooks, according to a specific system indicator such as a throughput rate, or a maximized channel capacity, to select one making the indicator optimum as the selected received power codebook.

The determining unit 740 is configured to determine a received power codebook element corresponding to the received power codebook index value according to the selected received power codebook index value.

After obtaining the received power codebook index value, the base station acquires the received power codebook element selected by the UE, and then takes it into account at the beginning of resource scheduling.

The processing unit 750 is configured to process a signal according to the corresponding received power codebook element.

According to the corresponding received power codebook element, some antenna ports may be turned on to serve the UE, or some antenna ports may be turned off to serve the UE, where refusing some antenna ports to serve the UE means turning off the antenna ports to refuse to serve the UE.

In addition, a downlink channel is estimated according to the corresponding received power codebook element, so that precoding processing is performed. When estimating the downlink channel, the base station may introduce a power difference among antennas which is not carried in the original precoding codebook element, and then obtain a more accurate channel estimation value, which may be further used in an inverse operation of channel estimation in the precoding processing not based on a codebook. The so-called introducing the power difference among antennas, may be correspondingly multiplying the channel estimation value by power differences from different antenna ports to the UE after the channel estimation value is obtained from the precoding codebook element, so as to obtain a new estimated channel.

It is worth pointing out that, the base station has a capability of independent selection during the scheduling process, that is, the base station may use the received power codebook index value sent by the UE, or may make a decision on its own, or may select not to schedule resources or send data for the UE at the current scheduling time.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 8:
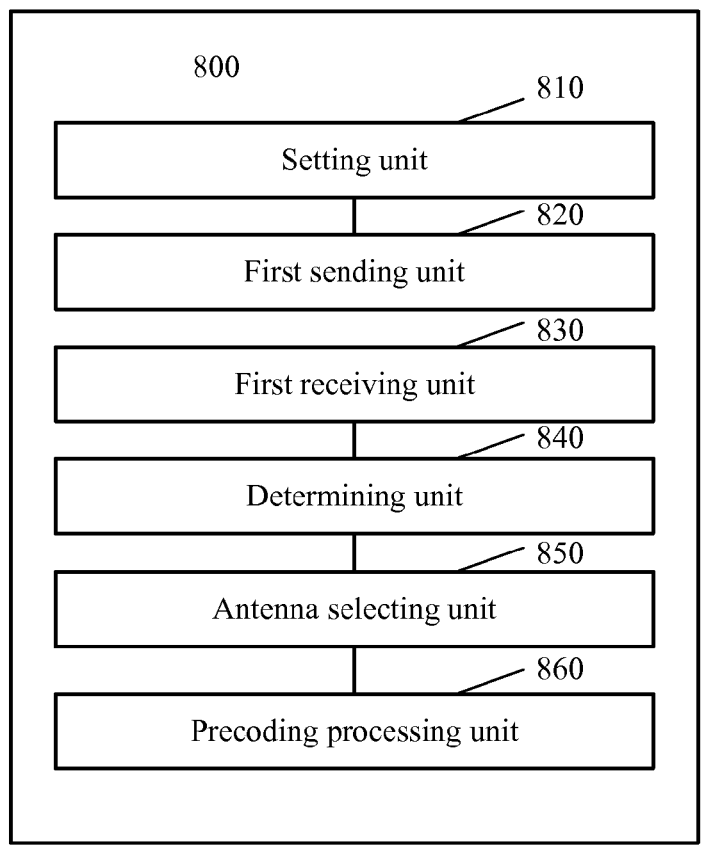
FIG. 8 is a block diagram of a device for sending channel state information according to another embodiment of the present invention.

FIG. 8 is a block diagram of a device 800 for sending channel state information according to another embodiment of the present invention.

A setting unit 810, a first sending unit 820, a first receiving unit 830, and a determining unit 840 of the device 800 are respectively the same as or similar to the setting unit 710, the first sending unit 720, the first receiving unit 730, and the determining unit 740 of the device 700. The difference between the device 700 and the device 800 lies in that, the device 800 includes an antenna selecting unit 850 and a precoding processing unit 860.

The setting unit 810 is configured to set the number of bits used for quantizing a relative received power value, where the relative received power value is a difference between received power of an antenna port of a UE measurement set and minimum received power of all antenna ports.

The first sending unit 820 is configured to send the number of bits used for quantizing the relative received power value to a user equipment, and the UE and a base station determine a received power codebook according to the number of bits used for quantizing the relative received power value and the UE measurement set.

The first receiving unit 830 is configured to receive a received power codebook index value, where the received power codebook index value is selected from multiple received power codebook index values.

The determining unit 840 is configured to determine a received power codebook element corresponding to the received power codebook index value according to the selected received power codebook index value.

As an embodiment of the setting unit 810, the number of bits used for quantizing the relative received power value is equal to the number of antenna ports of the UE measurement set.

If the number of antenna ports of the UE measurement set is 2, 4, or 8 respectively, the number of bits of the corresponding received power codebook element is 2, 4, or 8 respectively. The received power codebook may be determined according to the number of bits used for quantizing the relative received power value and the number of antenna ports of the UE measurement set. For example, the received power codebook with the number of antenna ports being 2 corresponds to a group of codebook elements with the number being $2^2=4$; the received power codebook with the number of antenna ports being 4 corresponds to a group of codebook elements with the number being $2^4=16$; and the received power codebook with the number of antenna ports being 8 corresponds to a group of codebook elements with the number being $2^8=256$. Generally, the number of antenna ports of the UE measurement set is 2, 4, or 8. Once set, the received power codebook does not need to be changed.

As another embodiment of the setting unit 810, the received power codebook element carries first selection information and second selection information, where the first selection information indicates that the received power from the antenna port is high received power, and the second selection information indicates that the received power from the antenna port is low received power.

For example, values of the received power codebook element include 1 and 0, where 1 indicates that the received power from the antenna port is high received power, and 0 indicates that the received power from the antenna port is low received power.

Referring to the above two embodiments, Table 1 shows an 8-bit received power codebook, which is used in a situation where the UE measurement set includes 8 antenna ports, and the number of bits used for quantizing the relative received power value is equal to the number of antenna ports of the UE measurement set, that is, 8. Reference is made to Table 1.

In the example of the UE measurement set of FIG. 2, 1 in the received power codebook element in Table 1 represents that the UE measures and judges that the designated antenna port has high received power, and 0 represents that the designated antenna port has low received power. According to the corresponding received power codebook element determined by the determining unit 840, the base station may usually select to turn on the antenna port corresponding to the value 1 to serve the UE; and turn off the antenna port corresponding to the value 0 to refuse to serve the UE. For example, if the sent received power codebook index value is 0, it indicates that the UE measures and judges that the antenna ports 0-3 have high received power, while the antenna ports 4-7 have low received power. The received power codebook index values 0-3 correspond to respectively turning on the antenna ports of the three sites in a cell, and the received power codebook index value 4 is used to turn on the first two antennas among four antennas of the macro base station, and other situations are not listed one by one.

The superscript T in the table indicates a transpose operation for a matrix.

Table 1 shows that the 8-bit received power codebook has 256 possibilities in total, that is, all possible situations are traversed. As an another optional embodiment, the 8-bit received power codebook may also be one preferred among the 256 possibilities, that is, a part of unused received power codebooks are excluded, for example, a situation where 3, 5, or 7 antennas are turned on may not be used. 8 bits may indicate 2^8=256 situations, and 7 bits may indicate 2^7=128 situations. If the received power codebook selectable by the UE is a preferred received power codebook, and the number is less than 128, one bit may be saved, and 7 bits are enough. In addition, it is considered that the base station has notified the UE in another manner, so that the preferred received power codebook is known to the UE.

The antenna selecting unit 850 is configured to turn on or refuse some antenna ports to serve the UE according to the corresponding received power codebook element, where refusing some antenna ports to serve the UE means turning off the antenna ports to refuse to serve the UE.

Regarding the situation where the received power codebook element is 0 or 1, the base station may select to turn on or turn off corresponding antenna ports according to the values of 0 and 1.

The precoding processing unit 860 is configured to estimate a downlink channel according to the corresponding received power codebook element, so as to perform precoding processing.

For the situation where the received power codebook element is not 0 or 1, when estimating the downlink channel, the base station may introduce a power difference among antennas which is not carried in the original precoding codebook element, and then obtain a more accurate channel estimation value, which may be further used in an inverse operation of channel estimation in the precoding processing not based on a codebook. The so-called introducing the power difference among antennas, may be correspondingly multiplying the channel estimation value by power differences from different antenna ports to the UE after the channel estimation value is obtained from the precoding codebook element, so as to obtain a new estimated channel.

From the above description, after the relative received codebook is taken into account, system performance affected by path losses from different antenna ports to the UE in the distributed antenna system scenario applied in the embodiment of the present invention is comprehensively considered and optimized when a signal is processed.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 9:
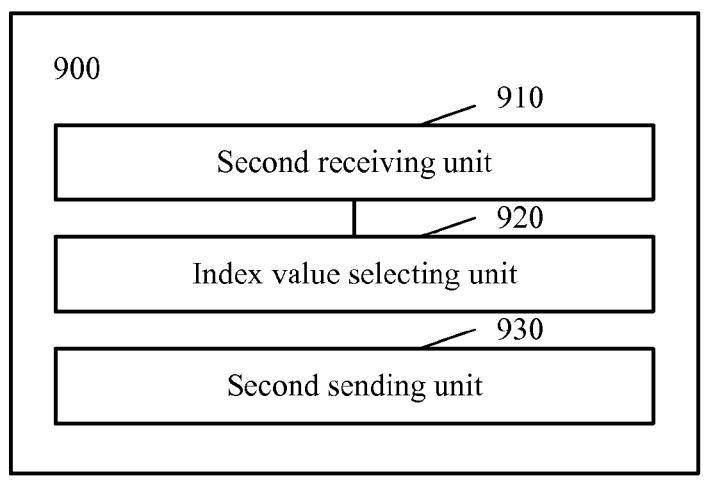
FIG. 9 is a block diagram of a device for sending channel state information according to another embodiment of the present invention.

FIG. 9 is a block diagram of a device 900 for sending channel state information according to another embodiment of the present invention.

The device 900 includes a second receiving unit 910, an index value selecting unit 920, and a second sending unit 930.

The second receiving unit 910 is configured to receive the number of bits used for quantizing a relative received power value, so that a UE and a base station determine a received power codebook according to the number of bits and a UE measurement set. The UE receives the number of bits used for quantizing the relative received power value. According to the two conditions, namely the number of bits used for quantizing the relative received power value and the UE measurement set, the UE and the base station may acquire the pre-known received power codebook used therebetween. For example, when the number of bits used for quantizing the relative received power value is the same, but the number of antenna ports of the UE measurement set is different, the UE and the base station determine to use different received power codebooks.

The relative received power refers to a relative received power value obtained for each antenna port by the UE after the UE firstly finds out which antenna port the minimum received power comes from, and then subtracts the minimum value from the received power from each antenna port. The obtained relative received power is a continuously changing value, and if the value is sent directly, an occupied overhead is excessively large. Generally, the sent relative received power value is discrete, so the obtaining of the discrete value inevitably involves a problem of quantization.

The UE measurement set refers to a set of antenna ports that the base station designates and notifies the UE to measure by using a specific method. Reference is made to the networking scenario in FIG. 1 and the UE measurement set in FIG. 2. In this embodiment, the site of at least one antenna port is different from the sites of other antenna ports. In this embodiment of the present invention, the base station has designated a measurement set for the UE and notified the UE by using a specific method.

The received power codebook includes multiple received power codebook elements, and each received power codebook element corresponds to a received power codebook index value.

The index value selecting unit 920 selects a received power codebook index value from multiple received power codebook index values.

During the process of selecting the received power codebook, the UE needs to traverse all possible received power codebooks, according to a specific system indicator such as a throughput rate, or a maximized channel capacity, to select one making the indicator optimum as the selected received power codebook.

The second sending unit 930 sends the selected received power codebook index value to the base station.

The UE sends the received power codebook index value to the base station periodically or aperiodically.

According to the above embodiment, by introducing a received power codebook and a corresponding feedback mechanism, the embodiment of the present invention can reduce a feedback overhead, improve a CSI feedback effect, realize antenna selection, and further improve overall system performance, and further is capable of multiplexing the precoding codebook of the existing centralized antenna system, thereby reducing complexity of the system.

Figure 10:
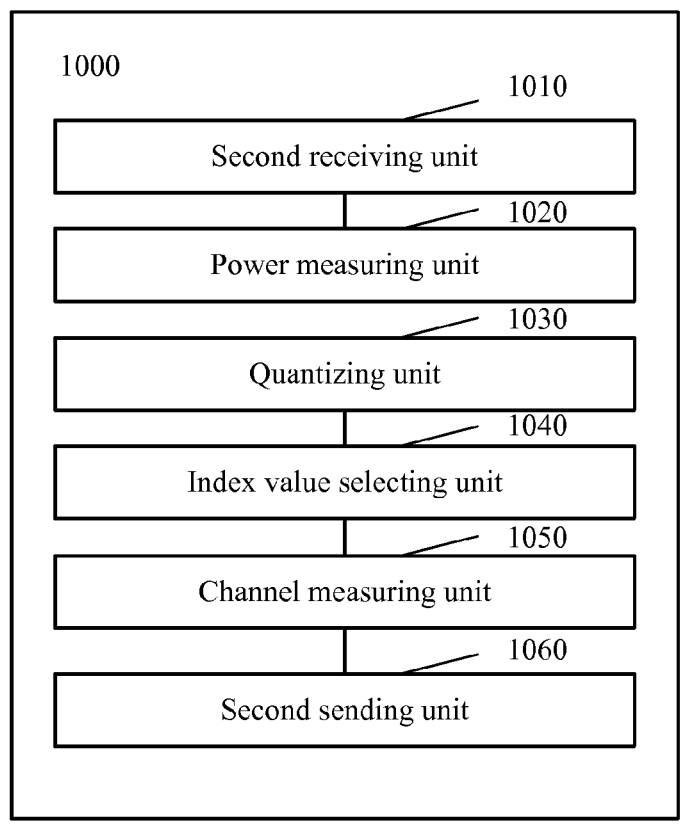
FIG. 10 is a block diagram of a device for sending channel state information according to another embodiment of the present invention.

FIG. 10 is a block diagram of a device 1000 for sending channel state information according to another embodiment of the present invention.

A second receiving unit 1010, an index value selecting unit 1040, and a second sending unit 1060 of the device 1000 are respectively the same as or similar to the second receiving unit 910, the index value selecting unit 920, and the second sending unit 930 of the device 900. The difference between the device 900 and the device 1000 lies in that, the device 1000 further includes a power measuring unit 1020, a quantizing unit 1030, and a channel measuring unit 1050.

The second receiving unit 1010 is configured to receive the number of bits used for quantizing a relative received power value, so that a UE and a base station determine a received power codebook according to the number of bits and a UE measurement set.

According to the two conditions, namely the number of bits used for quantizing the relative received power value and the UE measurement set, the UE and the base station may determine the pre-known received power codebook used therebetween. For example, when the number of bits used for quantizing the relative received power value is the same, but the number of antenna ports of the UE measurement set is different, the UE and the base station determine to use different received power codebooks.

As an embodiment of the number of bits used for quantizing the relative received power value, the number of bits used for quantizing the relative received power value is equal to the number of antenna ports of the UE measurement set. A situation where the UE measurement set includes 4 antenna ports is taken as an example hereinafter.

The power measuring unit 1020 is configured to measure radio channels according to the number of antenna ports of the UE measurement set, so as to obtain a relative received power value, where the radio channels refer to radio channels from the base station to antenna ports of the UE measurement set.

The UE respectively measures received power from the 4 antenna ports of the UE measurement set. After finding minimum received power, the UE subtracts the minimum received power from the received power of each antenna port, and then obtains the relative received power value of each antenna port.

The quantizing unit 1030 is configured to quantize the relative received power value according to the number of bits used for quantizing the relative received power value.

The index value selecting unit 1040 is configured to select a received power codebook index value from multiple received power codebook index values according to the quantized relative received power value.

As an alternative to the number of bits used for quantizing the relative received power value in this embodiment, the number of bits used for quantizing the relative received power value is equal to the number of antenna ports of the UE measurement set.

As another embodiment, in the codebook design, the received power codebook element carries first selection information and second selection information, where the first selection information indicates that the received power from the antenna port is high received power, and the second selection information indicates that the received power from the antenna port is low received power.

A situation where the UE measurement set includes 4 antenna ports is taken as an example hereinafter. When the number of bits used for quantizing the relative received power value is 4, a quantization table is set. A quantized result value range is $\{0, 3\}$, (the unit is dB), and corresponding binary bits are respectively $\{0, 1\}$. If the relative received power values of the antenna ports are 0, 1.5, 7, and 3.5 dB respectively, and a threshold is set to indicate that a value larger than 3 dB represents high received power, and that a value smaller than 3 dB represents low received power, the received power codebook elements which are fed back after quantization are $[0, 0, 1, 1]^T$ (the superscript T indicates a transpose operation for a matrix), and then a corresponding received power codebook index value is found out from a predefined received power codebook set.

Feeding back the quantized relative received power value is taken as a predetermined criterion herein, and a received power codebook index value is selected from multiple received power codebook index values. The predetermined criterion may also be other criteria, like maximizing a throughput rate, or maximizing a channel capacity.

According to the received power codebook element, the base station may usually select to turn on the antenna ports corresponding to values other than 0 to serve the UE; and turn off the antenna port corresponding to the value 0 to refuse to serve the UE.

The channel measuring unit 1050 measures rank indication RI, channel quality indication CQI, or a precoding matrix index PMI after the received power codebook index value is selected.

If the UE is required to measure the rank indication RI, the channel quality indication CQI, or the precoding matrix index PMI, the measurement is performed after the received power codebook index value is selected. A power difference among antennas which is carried in the received power codebook element is multiplexed, and then a more accurate channel estimation value is obtained to measure the rank indication RI, the channel quality indication CQI, or the precoding matrix index PMI. Therefore, the measured information reflects the channel information more accurately or the system overhead is reduced. For example, at this time, only the radio channel between the antenna port turned on by the base station for the UE and the UE is measured.

Referring to the above example, the received power codebook element corresponding to the received power codebook index value selected by the UE represents that the base station will only select some antenna ports in the measurement set to serve the UE, but the precoding codebook used when the UE measures the PMI may be the precoding codebook of all antenna ports. In this way, all antenna selection situations are applicable without designing a precoding codebook for each antenna port. As another alternative, a precoding codebook corresponding to the selected number of antenna ports may also be used. It is considered that the base station has notified the UE of the specifically used precoding codebook in a certain manner, for example, if the measurement set includes 8 antennas, and a quantization table with a quantized value range of $\{0, 1\}$ is used to quantize each relative received power value, 2, 4, or 8 antenna ports may be selected. After that, when the precoding codebook is used to measure the rank indication RI, the channel quality indication CQI, or the precoding matrix index PMI, the current precoding codebook of the 2, 4, or 8 antenna ports is used to correspond to situations of selecting 2, 4, or 8 antenna ports.

The second sending unit 1060 is configured to send the selected received power codebook index value to the base station.

The UE performs transmission to the base station through a PUCCH or PUSCH channel, and the feedback is periodic and aperiodic respectively. For periodic transmission, a transmission period for sending the selected received power codebook index value to the base station is set to be the same as or longer than that for sending the rank indication RI, and a time offset may be the same as that of the rank indication RI. Because the received power codebook is in a wideband feature, if the UE needs to feed back the received power codebook in a subframe, during the UE measurement, it is necessary to assume that the transmission is performed in all sub-bands, so as to obtain the received power codebook index value.

Reference is made to Table 2, which shows a periodic transmission mode using a PUCCH, which is compatible with the existing standard LTE Release 10.

LTE Release 10 has originally defined PUCCH formats 1-6 and corresponding sub-modes, and therefore in Table 2, the newly-added PUCCH format is designed to be 7. Mode 1-1, mode 2-1, mode 1-0, and mode 2-0 are different types defined in LTE Release 10 for feeding back the PMI, PI, and CQI. N represents the number of bits used for quantizing the relative received power value. N/A indicates that the received power codebook is not applicable in the modes and mode states in the table. A bandwidth part (Bandwidth part, briefed as BP) is defined in LTE Release 10, including one or more continuous sub-bands, and used as a unit of UE measurement and feedback. For the received power codebook, because it reflects a wideband feature, all values on the BP should be the same.

For aperiodic transmission, once a high layer is configured to trigger to send the received power codebook in the current subframe, during the UE measurement, it is necessary to assume that the transmission is performed in all sub-bands, so as to obtain the received power codebook index value. Reference may be made to Table 3 for the number of bits occupied during aperiodic transmission using a PUSCH.

By introducing a received power codebook and a corresponding feedback mechanism, the embodiment of the present invention can reduce a feedback overhead, improve a CSI feedback effect, realize antenna selection, and further improve overall system performance. Further, the codebook of the existing centralized antenna system can be multiplexed, complexity of the system is reduced, and compatibility is strong.

Figure 11:
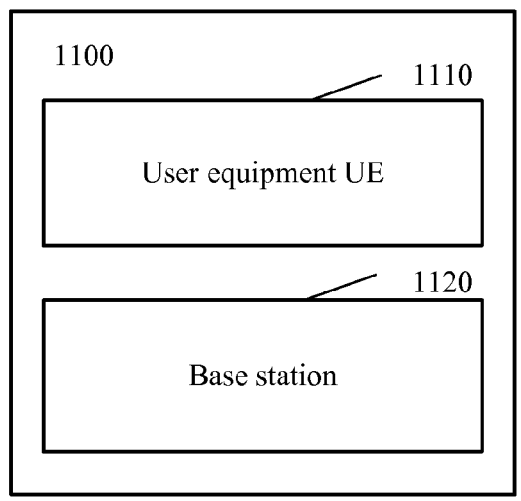
FIG. 11 is a block diagram of a system for sending channel state information according to an embodiment of the present invention.

FIG. 11 is a block diagram of a system 1100 for sending channel state information according to an embodiment of the present invention.

The system 1100 includes a user equipment UE 1110 and a base station 1120. The user equipment UE 1110 is the same as or similar to the device 900 and device 1000, and realizes the method 500 and method 600. The base station 1120 is the same as or similar to the device 700 and device 800, and realizes the method 300 and method 400. The user equipment UE 1110 and the base station 1120 realize information feedback by using the above solutions, and the details will not be described herein again.

By introducing a received power codebook and a corresponding feedback mechanism, the embodiments of the present invention can reduce a feedback overhead, improve a CSI feedback effect, realize antenna selection, and further improve overall system performance. Further, the codebook of the existing centralized antenna system can be multiplexed, complexity of the system is reduced, and compatibility is strong.

Persons of ordinary skill in the art should be aware that, in combination with the examples described in the embodiments disclosed in this specification, method Processes and units may be implemented by electronic hardware, computer software, or a combination thereof. To clearly describe the interchangeability between the hardware and the software, the foregoing has generally described Processes and composition of each embodiment according to functions. Whether the functions are performed by hardware or software depends on particular applications and design constraint conditions of the technical solutions. Persons of ordinary skill in the art can implement the described functions in varying ways for each particular application, but such implementation should not be interpreted as departure from the scope of the present invention.

The methods or Processes described in combination with the embodiments disclosed herein may be implemented by using hardware, a software program performed by a processor, or a combination thereof. The software program may be placed in a random access memory (RAM), a memory, a read-only memory (ROM), an electrically programmable ROM, an electrically erasable programmable ROM, a register, a hard disk, a removable magnetic disk, a CD-ROM, or a storage medium of any other form well-known in the technical field.

The present invention is described in detail with reference to the accompany drawing in combination with the exemplary embodiments, but the present invention is not limited to the foregoing. Various equivalent modifications or replacements made on the embodiments of the present invention by persons of ordinary skill in the art without departing from the spirit and essence of the present invention shall fall within the scope of the present invention.

What is claimed is:

1. A method for sending channel state information, comprising:
setting, by a base station, a number of bits used for quantizing a relative received power value, wherein the relative received power value is a difference between a received power of an antenna port of a UE (user equipment) measurement set and a minimum received power of all antenna ports of the UE measurement set;
determining, by the base station, a received power codebook according to the number of bits and the UE measurement set, wherein the received power codebook comprises multiple received power codebook elements, and each received power codebook element corresponds to a received power codebook index value;
sending, by the base station, the number of bits to the UE, so that the UE determines the received power codebook according to the number of bits and the UE measurement set;
receiving, by the base station, a first received power codebook index value sent by the UE, wherein the first received power codebook index value is selected from multiple received power codebook index values by the UE;
determining, by the base station, a first received power codebook element corresponding to the first received power codebook index value; and
processing, by the base station, a signal according to the first received power codebook element.

2. The method according to claim 1, wherein the number of bits is equal to a number of antenna ports of the UE measurement set.

3. The method according to claim 1, wherein the first received power codebook element carries first selection information and second selection information,
wherein the first selection information indicates that the received power from the antenna port is high received power, and
wherein the second selection information indicates that the received power from the antenna port is low received power.

4. The method according to claim 3, wherein the processing, by the base station, the signal according to the first received power codebook element comprises:
- selecting, by the base station, the antenna port to serve the UE according to the first selection information; and
- refusing, by the base station, the antenna port to serve the UE according to the second selection information.

5. The method according to claim 3, wherein the processing, by the base station, the signal according to the first received power codebook element comprises:
- receiving, by the base station, channel state information (CSI) sent by the UE, wherein the CSI is obtained by the UE according to the first received power codebook element; and
- performing, by the base station, precoding processing according to the CSI.

6. A method for sending channel state information, comprising:
- receiving, by a UE (user equipment), a number of bits used for quantizing a relative received power value sent by a base station, wherein the relative received power value is a difference between a received power of an antenna port of a UE measurement set and a minimum received power of all antenna ports of the UE measurement set;
- determining, by the UE, a received power codebook according to the number of bits and the UE measurement set, wherein the received power codebook comprises multiple received power codebook elements, and each received power codebook element corresponds to a received power codebook index value;
- selecting, by the UE, a first received power codebook index value from multiple received power codebook index values; and
- sending, by the UE, a first received power codebook index value to the base station, so that the base station determines a first received power codebook element corresponding to the first received power codebook index value and processes a signal according to the first received power codebook element.

7. The method according to claim 6, wherein the number of bits is equal to a number of antenna ports of the UE measurement set.

8. The method according to claim 6, wherein the first received power codebook element carries first selection information and second selection information,
- wherein the first selection information indicates that the received power from the antenna port is high received power, and
- wherein the second selection information indicates that the received power from the antenna port is low received power.

9. The method according to claim 6, wherein the selecting, by the UE, the first received power codebook index value from the multiple received power codebook index values comprises:
- measuring, by the UE, radio channels according to the number of antenna ports of the UE measurement set, so as to obtain the relative received power value, wherein the radio channels are radio channels from the base station to antenna ports of the UE measurement set;
- quantizing, by the UE, the relative received power value according to the number of bits; and
- selecting, by the UE, the first received power codebook index value from multiple received power codebook index values according to the quantized relative received power value.

10. The method according to claim 9, further comprising:
- measuring, by the UE, rank indication (RI), channel quality indication information (CQI), or a precoding matrix index (PMI) after selecting the first received power codebook index value.

11. The method according to claim 10, wherein a first transmission period is longer than or equal to a second transmission period,
- wherein the first transmission period refers to a signal period for periodically sending the first received power codebook index value, and
- wherein the second transmission period refers to a signal period for periodically sending the RI.

12. A base station, comprising:
- a setting unit, configured to set a number of bits used for quantizing a relative received power value, wherein the relative received power value is a difference between a received power of an antenna port of a UE (user equipment) measurement set and a minimum received power of all antenna ports of the UE measurement set;
- a determining unit, configured to determine a received power codebook according to the number of bits and the UE measurement set, wherein the received power codebook comprises multiple received power codebook elements, and each received power codebook element corresponds to a received power codebook index value;
- a first sending unit, configured to send the number of bits to the UE, so that the UE determines the received power codebook according to the number of bits and the UE measurement set;
- a first receiving unit, configured to receive a first received power codebook index value sent by the UE, wherein the first received power codebook index value is selected from multiple received power codebook index values by the UE;
- the determining unit is further configured to determine a first received power codebook element corresponding to the first received power codebook index value; and
- a processing unit, configured to process a signal according to the first received power codebook element.

13. The base station according to claim 12, wherein the number of bits is equal to a number of antenna ports of the UE measurement set.

14. The base station according to claim 12, wherein the first received power codebook element carries first selection information and second selection information,
- wherein the first selection information indicates that the received power from the antenna port is high received power, and
- wherein the second selection information indicates that the received power from the antenna port is low received power.

15. The base station according to claim 14, wherein the processing the signal according to the first received power codebook element comprises:
- selecting the antenna port to serve the UE according to the first selection information; and
- refusing the antenna port to serve the UE according to the second selection information.

16. The base station according to claim 14, wherein the processing the signal according to the first received power codebook element comprises:
- receiving channel state information (CSI) sent by the UE, wherein the CSI is obtained by the UE according to the first received power codebook element; and
- performing precoding processing according to the CSI.

17. A UE (user equipment), comprising:
a receiving unit, configured to receive a number of bits used for quantizing a relative received power value sent by a base station, wherein the relative received power value is a difference between received power of an antenna port of a UE measurement set and a minimum received power of all antenna ports of the UE measurement set;
a determining unit, configured to determine a received power codebook according to the number of bits and the UE measurement set, wherein the received power codebook comprises multiple received power codebook elements and each received power codebook element corresponds to a received power codebook index value;
an index value selecting unit, configured to select a first received power codebook index value from multiple received power codebook index values; and
a sending unit, configured to send the first received power codebook index value to the base station, so that the base station determines a first received power codebook element corresponding to the first received power codebook index value and processes a signal according to the first received power codebook element.

18. The UE according to claim 17, wherein the number of bits is equal to a number of antenna ports of the UE measurement set.

19. The UE according to claim 17, wherein the first received power codebook element carries first selection information and second selection information,
wherein the first selection information indicates that the received power from the antenna port is high received power, and
wherein the second selection information indicates that the received power from the antenna port is low received power.

20. The UE according to claim 17, wherein the selecting the first received power codebook index value from the multiple received power codebook index values comprises:
measuring radio channels according to a number of antenna ports of the UE measurement set, so as to obtain the relative received power value, wherein the radio channels are radio channels from the base station to antenna ports of the UE measurement set;
quantizing the relative received power value according to the number of bits; and
selecting the first received power codebook index value from multiple received power codebook index values according to the quantized relative received power value.

21. The UE according to claim 20, wherein rank indication (RI), channel quality indication (CQI), or a precoding matrix index (PMI) is measured after the first received power codebook index value is selected.

22. The UE according to claim 21, wherein a first transmission period is longer than or equal to a second transmission period,
wherein the first transmission period refers to a signal period for periodically sending the first received power codebook index value, and
the second transmission period refers to a signal period for periodically sending the RI.

* * * * *